US007798277B2

United States Patent
Juricak et al.

(10) Patent No.: US 7,798,277 B2
(45) Date of Patent: Sep. 21, 2010

(54) MACHINE RETARDER

(75) Inventors: Steven J. Juricak, Yorkville, IL (US); Bradley J. LaForest, Yorkville, IL (US); Arthur Milkowski, Sugar Grove, IL (US); Michael A. Spielman, Brookfield, IL (US)

(73) Assignee: Caterpillar Inc, Peoria, IL (US)

( * ) Notice: Subject to any disclaimer, the term of this patent is extended or adjusted under 35 U.S.C. 154(b) by 623 days.

(21) Appl. No.: 11/806,354

(22) Filed: May 31, 2007

(65) Prior Publication Data

US 2008/0298977 A1     Dec. 4, 2008

(51) Int. Cl.
*B60K 17/00* (2006.01)
(52) U.S. Cl. .......................... 180/307; 180/306; 60/421
(58) Field of Classification Search ................. 180/242, 180/243, 306, 307, 53.4, 305; 60/421, 422, 60/449, 390; 701/55, 54, 69
See application file for complete search history.

(56) References Cited

U.S. PATENT DOCUMENTS

| 3,859,970 | A | | 1/1975 | Dreisin | |
|---|---|---|---|---|---|
| 3,964,262 | A | | 6/1976 | Patton | |
| 3,986,358 | A | | 10/1976 | Hoffmann | |
| 3,999,386 | A | | 12/1976 | Crull et al. | |
| 4,015,881 | A | | 4/1977 | Adachi | |
| 4,324,387 | A | | 4/1982 | Steinhagen | |
| 4,484,655 | A | | 11/1984 | Sheppard, Sr. | |
| 4,537,029 | A | * | 8/1985 | Gunda et al. ................... 60/390 |
| 4,573,319 | A | * | 3/1986 | Chichester ................... 60/422 |
| 5,040,114 | A | * | 8/1991 | Ishikawa et al. .............. 701/54 |
| 5,596,893 | A | * | 1/1997 | Stehling et al. ............... 70/175 |
| 5,667,452 | A | | 9/1997 | Coutant | |
| 5,754,428 | A | * | 5/1998 | Ishikawa ...................... 701/55 |
| 6,308,441 | B1 | * | 10/2001 | Bolitho ....................... 37/411 |
| 6,321,535 | B2 | * | 11/2001 | Ikari et al. .................... 60/421 |
| 6,817,455 | B1 | | 11/2004 | Gazyakan et al. | |
| 6,986,727 | B2 | | 1/2006 | Kuras et al. | |
| 7,146,266 | B2 | * | 12/2006 | Teslak et al. ................. 701/69 |
| 7,281,373 | B2 | * | 10/2007 | Kim ............................. 60/449 |
| 2008/0086254 | A1 | | 4/2008 | Anderson et al. | |

FOREIGN PATENT DOCUMENTS

| DE | 3041603 | 5/1982 |
|---|---|---|
| DE | 8615387 | 3/1991 |
| DE | 10303206 | 7/2004 |
| EP | 1674766 | 6/2006 |
| GB | 1132473 | 11/1968 |
| JP | 4219568 | 8/1992 |
| WO | 8704220 | 7/1987 |
| WO | 9847732 | 10/1998 |

\* cited by examiner

*Primary Examiner*—Hau V Phan
(74) *Attorney, Agent, or Firm*—Finnegan, Henderson, Farabow, Garrett & Dunner LLC (57) ABSTRACT

A system is provided for controllably absorbing energy associated with a machine. The system may include a power source configured to provide power to a hydraulic pump, wherein the hydraulic pump is configured to provide a flow of fluid to a hydraulic dissipation circuit and to one or more implement system hydraulic cylinders, and wherein the hydraulic dissipation circuit is configured to generate a load associated with the hydraulic pump. The system may also include at least one valve configured to provide the flow of fluid to the hydraulic dissipation circuit in response to one or more control signals and a controller configured to receive an input signal from an operator actuated device, and generate the one or more control signals based on the input signal.

20 Claims, 6 Drawing Sheets

MACHINE RETARDER

TECHNICAL FIELD

The present disclosure relates generally to retarding of a machine, and more particularly, to dissipating energy associated with motion of a machine through a hydraulic retarding mechanism.

BACKGROUND

Machines such as, for example, dozers, loaders, excavators, motor graders, and other types of heavy machinery utilize power sources to accomplish tasks including motion of the machine and operation of an implement driven by an implement pump. These power sources have limited rotational speed ranges measured in rotations per minute (RPM) and are often linked to one or more power conversion units, which may in turn be operatively connected to one or more driven traction devices with the goal of imparting motion to the machine through use of the rotational energy.

However, once a machine is underway, the machine may develop significant momentum based on the weight and velocity of the machine, among other things (e.g., potential energy associated with elevation of the machine). Where it is desired to decelerate the machine, mechanical braking (e.g., disc and/or drum type brakes) may be used in conjunction with some level of engine braking. Engine braking involves the use of energy dependent compression strokes of the power source, frictional losses, and ancillary mechanisms to dissipate energy and decelerate the machine. When using engine braking, some of the momentum associated with the machine is transferred back into rotational energy and transmitted through driven traction devices, a power conversion unit, and ultimately to the power source resulting in an increase in rotational speed of the power source.

Dependence on mechanical braking can lead to overheating and premature wear on the braking system. Engine braking may lead to exceeding the rotational speed constraints of the power source (i.e., over-speeding) and therefore, may cause premature wear and/or damage to the power source. Therefore, in previous systems, limitation of mechanical braking and the over-speeding condition have been accomplished via use of a fluid coupling (i.e., a torque converter) between the power source and the power conversion unit. This fluid coupling may absorb a portion of the momentum associated with the machine and convert it into fluid heat energy and/or rotational energy, but may be insufficient to fully retard the motion of the machine. Further recent changes to power conversion units have, in some cases, eliminated the fluid coupling between the power source and the power conversion unit, thus resulting in even greater potential for over-speed of the power source and substantial reliance on mechanical braking systems. Such reliance may lead to substantial wear and early failure of components associated with the power source and mechanical braking systems.

One system describing an over-speed protection control for an engine is disclosed in U.S. Pat. No. 3,999,386 (the '386 patent) issued to Crull et al. on Dec. 28, 1976. The system includes at least one fixed-displacement pump driven by an engine and having a valve means operable to cause an increase in pressure associated with the pump in response to an engine speed exceeding a predetermined value. Such an increase in pressure thereby increases the load on the engine and affects a retarding of the engine. The system further includes a control circuit for detecting when the engine speed exceeds the predetermined value.

Although the system of the '386 patent may retard the engine upon an over-speed condition, the '386 patent is limited in that the control occurs only upon an over-speed event, thus leading to greater reliance on mechanical braking systems unless the over-speed condition occurs. Further, the system of the '386 patent is in operation continuously. In other words at any time an over-speed condition has been met, the system of the '386 patent causes a retarding of the machine, thereby leading to potential degradation in machine performance when it is desired to increase the engine speed beyond the predetermined value even for short periods of time.

The present disclosure is directed to overcoming one or more of the problems or disadvantages in the prior art control systems.

SUMMARY OF THE DISCLOSURE

In one embodiment, the present disclosure is directed to a system for controllably absorbing energy associated with a machine. The system may include a power source configured to provide power to a hydraulic pump, wherein the hydraulic pump is configured to provide a flow of fluid to a hydraulic dissipation circuit and to one or more implement system hydraulic cylinders, and wherein the hydraulic dissipation circuit is configured to generate a load associated with the hydraulic pump. The system further may include at least one valve configured to provide the flow of fluid to the hydraulic dissipation circuit in response to one or more control signals and a controller configured to receive an input signal from an operator actuated device, and provide the one or more control signals based on the input signal.

In another embodiment, the present disclosure is directed to a method for controllably absorbing energy associated with a machine. The method may include receiving an input signal indicative of a desired braking force from an operator actuated device, and generating one or more control signals based on the input signal. The method further may include providing the one or more control signals to at least one device configured to modify a flow of fluid in a hydraulic dissipation circuit, wherein the hydraulic dissipation circuit is configured to generate a load associated with the hydraulic pump, and wherein the flow of fluid is generated by a hydraulic pump operatively connected to a power source associated with the machine, and wherein the hydraulic pump is configured to provide the flow of fluid to at least the hydraulic dissipation circuit and to one or more implement system hydraulic cylinders.

In yet another embodiment, the present disclosure is directed to a machine. The machine may include a frame, a power conversion unit mounted to the frame, a traction device operatively connected to the power conversion unit, and a variable displacement hydraulic pump configured to provide a flow of fluid to a hydraulic dissipation circuit and to one or more implement system hydraulic cylinders, wherein the hydraulic dissipation circuit is configured to generate a load associated with the hydraulic pump. The machine may further include a power source operatively connected to the frame, the traction device, and the variable displacement hydraulic pump, at least one valve configured to provide the flow of fluid to the hydraulic dissipation circuit in response to one or more control signals, and a controller configured to receive an input signal from an operator actuated device, and provide the one or more control signals based on the input signal.

DETAILED DESCRIPTION

Figure 1:
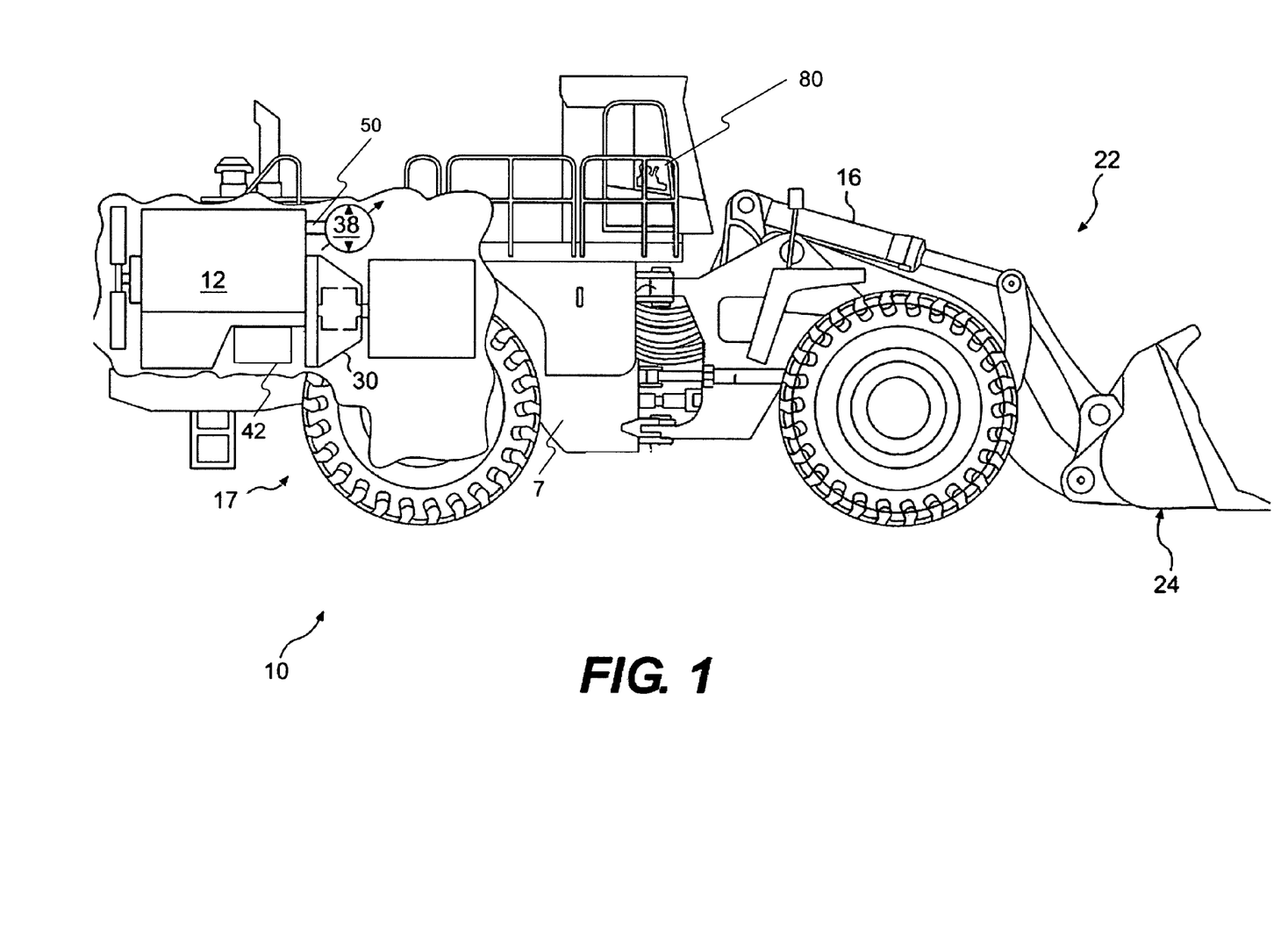
FIG. 1 illustrates an exemplary embodiment of a machine.

FIG. 1 illustrates an exemplary embodiment of a machine 10. Machine 10 may be a mobile machine that performs some type of operation associated with an industry such as mining, construction, farming, or any other industry known in the art. For example, machine 10 may be an earth moving machine such as a wheel loader, a dump truck, a backhoe, a motor grader, or any suitable machine. Machine 10 may include a power source 12, a frame 7, an operator interface 80, at least one hydraulic circuit 200 (not shown in FIG. 1) including hydraulic pump 38, and a power conversion unit 30 connected to at least one driven traction device 17. Machine 10 may further include one or more implement systems 22, a cooling package (not shown), and a mechanical braking system (not shown).

Power source 12 may be an engine such as, for example, a diesel engine, a gasoline engine, a gaseous fuel powered engine such as a natural gas engine, or any other engine apparent to one skilled in the art. Power source 12 may also embody another source of power such as a fuel cell, a power storage device, or any other source of power known in the art.

Power source 12 may include sensors configured to sense, among other things, a speed associated with power source 12. Such sensors may include electrical and/or mechanical sensors or any combination thereof. For example, a magnetic pickup may be mounted near a flywheel associated with power source 12 such that the flywheel may trigger a response in the pickup for each rotation of the flywheel.

Implement system 22 may include an implement 24 for performing various tasks including, for example, loading, compacting, lifting, brushing, and other desired tasks. Implement 24 may include numerous devices such as, for example, buckets, compactors, forked lifting devices, brushes, or other suitable devices as desired for accomplishing particular tasks. For example, machine 10 may be tasked to move excavated earth from one point to another at a mine or similar site. Such an arrangement may be conducive to utilizing a bucket loader implement similar to that shown as implement 24. Further implement system 22 may accomplish such tasks by imparting various motions to implement 24. Such motions may include, for example, rotating, extending, raising, lowering, tilting, and other suitable motions.

Implement system 22 may further include one or more implement system hydraulic cylinders 16 fluidly connected to hydraulic pump 38, for imparting motion to various portions of implement system 22 (e.g., lifting, tilting, and/or rotating implement 24). Implement system hydraulic cylinders 16 may work in cooperation with various linkages associated with implement system 22 to affect a desired motion. Motion of implement system 22 may be imparted via extension and retraction of pistons associated with the one or more implement system hydraulic cylinders 16.

It is important to note that implement system 22 may further include other hydraulic systems configured to perform additional tasks associated with machine 10. For example, implement system 22 may include steering systems, fan systems, and any other suitable hydraulic system associated with machine 10 without departing from the scope of the present disclosure.

Power conversion unit 30 may be any type of device configured for converting at least a portion of the power output supplied by power source 12 into a form useable at traction devices 17. For instance, power-conversion unit 30 may be a mechanical transmission including a fluidly connected torque converter and planetary gears configured to modify gear ratios associated with power-conversion unit 30. In another embodiment, power-conversion unit 30 may include a continuously or infinitely variable transmission including, for example, a dual shaft configuration and an infinitely variable gear set configured to provide varying gear and speed ratios. In yet another embodiment, power-conversion unit 30 may include an electric generator that converts at least a portion of the power output of power source 12 into electrical energy. In yet another embodiment, power conversion unit 30 may include a hydro-static system including a hydraulic pump configured to convert at least a portion of the power output of power source 12 into a flow of pressurized fluid for driving one or more hydraulic motors associated with traction devices 17. And, in yet another embodiment, power conversion unit 30 may include a split torque transmission such as that described in U.S. Pat. No. 5,667,452 to Coutant, the contents of which are herein incorporated by reference. One of ordinary skill in the art will understand that the methods of the present disclosure may be utilized in conjunction with numerous other power conversion units and the examples are meant to be exemplary only.

Machine 10 may also include a mechanical braking system (not shown) operatively connected to the one or more traction devices 17 and frame 7. Mechanical braking system (not shown) may be configured to affect a slowing or stopping of machine 10 via forces (e.g., friction) associated with components of mechanical braking system (not shown) and one or more traction devices 17. Mechanical braking system (not shown) may include rotors, drums, calipers, pads and other various elements configured to produce forces configured to affect a slowing or stopping of machine 10. Therefore, wear associated with mechanical braking system (not shown) may vary based on factors including weight and operating methods of machine 10, among other things. One of ordinary skill in the art will recognize that numerous configurations of mechanical braking systems may be used, as are well known in the art.

Cooling package (not shown) may be located at any position on machine 10. For example, cooling package (not shown) may be located on a front, back, or side of machine 10. Cooling package (not shown) may include various components configured to remove heat from various sources and pass such heat to the atmosphere. Components associated with cooling package (not shown) may include an airflow provider and one or more heat exchangers, among other things. Portions of cooling package (not shown) may be fluidly connected to hydraulic lines associated with hydraulic pump 38 for transporting a flow of pressurized fluid to cooling package (not shown).

Operator interface 80 may be located within an operator cabin of machine 10, in close proximity to a seat (not shown), and may include numerous devices to control the components, features, and functions of machine 10. In one example, operator interface 80 may include a retarding actuator 84 (not shown in FIG. 1). It is contemplated that operator interface 80 may include additional or different control devices such as, for example, levers, switches, buttons, pedals, wheels, and other control devices known in the art.

Retarding actuator 84 (not shown in FIG. 1) may be configured to control motion of machine 10 via retarding (i.e., power absorption) of power source 12. Retarding actuator 84 may exist in conjunction with a separate mechanical braking actuator (not shown) or both retarding actuator 84 and a mechanical braking actuator may be implemented together as a single actuator (e.g., a "brake" pedal). Retarding actuator 84 may include a pedal, a joystick, a button, a wheel mechanism, or any other suitable device for generating a signal indicative of a desired braking force in response to operator actuation. In one embodiment, retarding actuator 84 may be a pedal tiltable about at least one axis and configured to generate a signal that is proportional to the distance traveled by the pedal. For example, retarding actuator 84 may be aligned at the feet of a machine operator and tiltable in a forward position relative to the machine operator to cause an increase in a desired braking force relative to the distance traveled by retarding actuator 84 about the axis. Retarding actuator 84 may have a maximum tilt angle limit (full retarding) and a minimum tilt angle limit (no retarding), with a variable amount of retarding in between such limits.

Signals associated with retarding actuator 84 may be configured as a mechanical signal (e.g., hydraulic signal), electrical signals, electro-mechanical signals, etc. The signals may be generated utilizing hydraulic cylinders, variable resistance devices (e.g., potentiometer), electromagnets, and/or any other suitable device. The generated signals may be proportional to the amount of force and/or travel utilized by the operator to actuate retarding actuator 84 and may indicate a braking force desired by the operator. For example, an operator of machine 10 may position machine 10 on an incline. The operator may wish to control motion of machine 10 while traveling down the incline, and so may actuate retarding actuator 84 with a sufficient level of force to produce the desired level of motion control (e.g., retarding). Methods for performing the retarding associated with machine 10 will be discussed in greater detail below with reference to FIGS. 2A-D. Further, the operator may actuate a mechanical braking actuator (not shown) in conjunction with retarding actuator 84, thereby also generating forces associated with mechanical braking system (not shown).

FIGS. 2A-D illustrate exemplary hydraulic circuits 200 consistent with embodiments of the present disclosure. Hydraulic circuit 200 may be configured to distribute a flow of pressurized fluid to various systems associated with machine 10 including implement system 22 and hydraulic dissipation circuit 280, among other things. Hydraulic circuit 200 may include a hydraulic pump 38, one or more valves, a hydraulic dissipation circuit 280, and a controller 42, among other things.

One or more valves may be fluidly connected within hydraulic circuit 200 and configured to control a flow of pressurized fluid within hydraulic circuit 200 (e.g., to hydraulic dissipation circuit 280 and/or implement system 22) based on an operator command (e.g., an input signal from retarding actuator 84 and/or a joystick controller) provided to controller 42. Such valves may include solenoid valves, spool valves, shuttle valves, or any other suitable control-type valve and may include hydraulic and/or electro-hydraulic actuation means. For example, implement valve 60 may include one or more directional spool valves fluidly connected to hydraulic pump 38, hydraulic dissipation circuit 280 (e.g., in parallel), and implement systems 22, among other things. Implement valve 60 may therefore, be configured to control fluid flow between hydraulic dissipation circuit 280, implement system 22, and hydraulic pump 38, among other things. Further, implement valve 60 may be configured to direct fluid to one or more additional implement systems 22 associated with machine 10 (e.g., a steering system, a fan system, etc.) based on operator and/or controller command, among other things. One of ordinary skill in the art will recognize that implement valve 60 may include more or fewer valves as desired to direct flows of pressurized fluid to such systems. Additional valves used in hydraulic circuit 200 and hydraulic dissipation circuit 280 will be discussed in greater detail with reference to particular embodiments discussed below.

Controller 42 may be a mechanical based controller (e.g., hydraulic master cylinder) and/or an electrical based controller (e.g., a computer) configured to receive an input signal from retarding actuator 84 and generate a control signal in response to the input signal, among other things. For example, controller 42 may be communicatively connected to retarding actuator 84 and devices associated with hydraulic circuit 200 (e.g., valves, orifices, etc.) thereby enabling controller 42 to receive an input signal and transmit related control signals to various devices associated with machine 10 and hydraulic circuit 200. For example, controller 42 may receive an input signal from retarding actuator 84 indicative of a desired braking force.

Controller 42 may further be configured to generate and provide a control signal including various characteristics based on an input signal to one or more devices (e.g., valves, orifices, etc.) associated with hydraulic circuit 200, among other things. Characteristics of the control signal may include, for example, current, voltage, frequency, and/or other suitable characteristics. In one embodiment, controller 42 may be configured to vary a current and/or a voltage characteristic of the control signal based on the input signal indicative of a desired braking force. Controller 42 may store algorithms and/or data related to determining how characteristics of the control signal should be configured in relation to the input signal. In such an embodiment, when an operator actuates retarding actuator 84, indicating a desired braking force, controller 42 may provide a control signal to one or more devices associated with hydraulic dissipation circuit 280, thereby causing operation of the one or more devices to produce a modification of fluid pressures and flows relative to the desired braking force. For example, upon actuation of retarding actuator 84 by an operator, controller 42 may cause a voltage associated with the control signal to ramp from 4 volts to 12 volts, thereby operating a solenoid valve and modifying a flow of pressurized fluid to flow within hydraulic dissipation circuit 280, among other things. Control signals and operation of hydraulic dissipation circuit 280 will be discussed in greater detail below.

While controller 42 is depicted as a single entity, it is contemplated that one or more controllers may carry out one or more functions associated with controller 42. For example, one controller may monitor variables associated with power source 12 while another controller may provide control signals to one or more devices (e.g., valves) associated with hydraulic circuit 200.

Hydraulic pump 38 may be configured to draw a fluid from a reservoir 48 and produce a flow of fluid at a particular discharge pressure. In so doing, hydraulic pump 38 may exert a load on power source 12 and/or traction devices 17 via power conversion unit 30. Such a load may be calculated based on a discharge pressure of the pump and an associated flow rate of pressurized hydraulic fluid from the pump, and efficiency, and may, therefore, absorb an approximately equivalent amount of energy from power source 12, power conversion unit 30, and/or traction devices 17, depending on a desired operation (e.g., retarding machine 10 and/or operating implement system 22). Hydraulic pump 38 may include a variable displacement pump, a fixed displacement pump, a variable flow pump, or any other device for pressurizing a flow of fluid known in the art. For example, hydraulic pump 38 may be a variable displacement pump including a pump-flow control component including a swash plate configured to vary the stroke of one or more pistons associated with the pump and an electro-hydraulic controller configured to manipulate the swash plate. By varying the stroke of the one or more pistons, maximum pump flow may be increased or decreased as desired, thereby increasing or decreasing the resulting maximum pump load that may be applied to power source 12. Therefore, torque may also be calculated based on the angle of the swash plate and a discharge pressure associated with hydraulic pump 38. Maximum pump load, as used herein, will be understood to mean the maximum torque that may be applied by hydraulic pump 38 to power source 12 at any particular discharge pressure with pump 38 operating at a flow rate based on an angle associated with the swash plate.

Hydraulic pump 38 may be operatively connected to power source 12 by, for example, a countershaft 50, a belt (not shown), an electrical circuit (not shown), or in any other suitable manner. Because hydraulic pump 38 may be operatively connected to power source 12, hydraulic pump 38 may act to absorb energy from power source 12 based on the load applied by hydraulic pump 38 to power source 12. For example, where kinetic energy of machine 10 is transferred from traction devices 17 to power source 12 via drive shafts and power conversion unit 30, a portion of such kinetic energy may be absorbed by application of a load from hydraulic pump 38 to power source 12 via countershaft 50. Additionally, pressurized fluid from hydraulic pump 38 may be supplied to numerous hydraulic circuits included with machine 10. For example, a pump discharge pressure associated with hydraulic pump 38 may be used as a load-sense signal and fed back to a controller, hydraulic pump 38, and/or other suitable devices.

Hydraulic pump 38 may further be configured to receive a load sense signal and maintain a pressure associated with hydraulic pump 38 based on the sensed load. Maintaining the pressure may be accomplished by adjusting pump flow through modification of the swash plate angle according to the load sense signal. For example, when implement system 22 is in operation, a pressure associated with implement system hydraulic cylinders 16 may operate against hydraulic pump 38, thus exerting a pressure against hydraulic pump 38. This pressure may be fed back to hydraulic pump 38 such that the angle associated with a swash plate may be modified and the discharge pressure associated with hydraulic pump 38 maintained. One of ordinary skill in the art will recognize that flow associated with hydraulic pump 38 may be controlled using the load sense signal, the electro-hydraulic controller, a combination thereof, or any other suitable method for controlling pump flow (e.g., a valve).

Hydraulic pump 38 may also be configured to provide the pressurized flow of fluid to hydraulic dissipation circuit 280 and/or one or more implement system hydraulic cylinders 16. Hydraulic dissipation circuit 280 may be configured to controllably absorb energy associated with machine 10, while implement system hydraulic cylinders 16 may utilize the flow of fluid for imparting motion to implement system 22, among other things.

Hydraulic dissipation circuit 280 may include fixed area orifices, variable area orifices, pressure relief valves, directional spool valves, and heat exchangers, among other things. Fixed area orifices may be configured to provide a fixed pressure drop across an associated orifice with a resulting flow rate proportional to the pressure drop across the orifice based on fluid density and viscosity, among other things. Fixed area orifices may be specifically designed as such and/or may include conduits with a restricted diameter, among other things. One of ordinary skill in the art will recognize that a fixed area orifice may be embodied in numerous configurations without departing from the scope of the present disclosure.

Figure 2A:
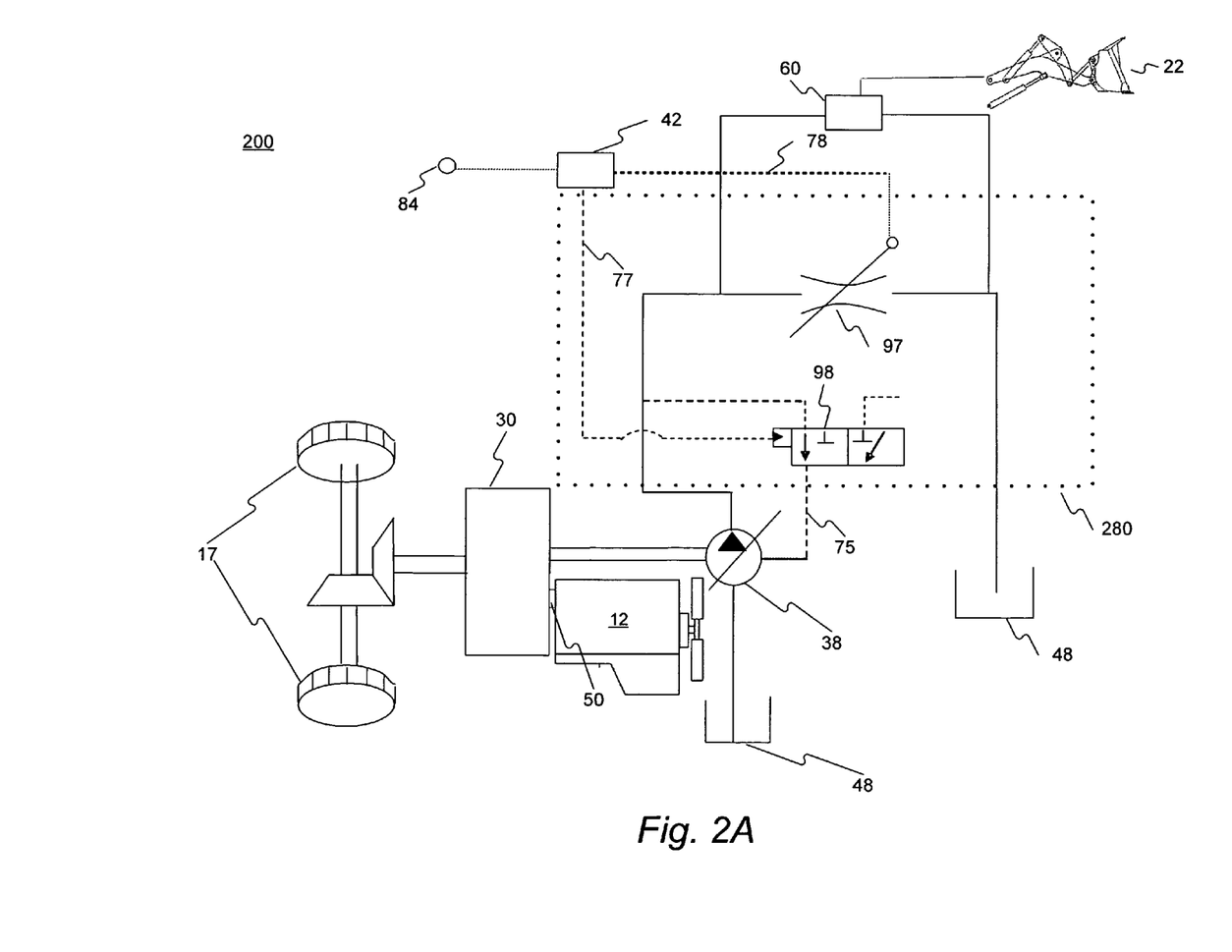
FIGS. 2A-D illustrate high level hydraulic circuit schematics consistent with embodiments of the present disclosure.
Figure 2B:
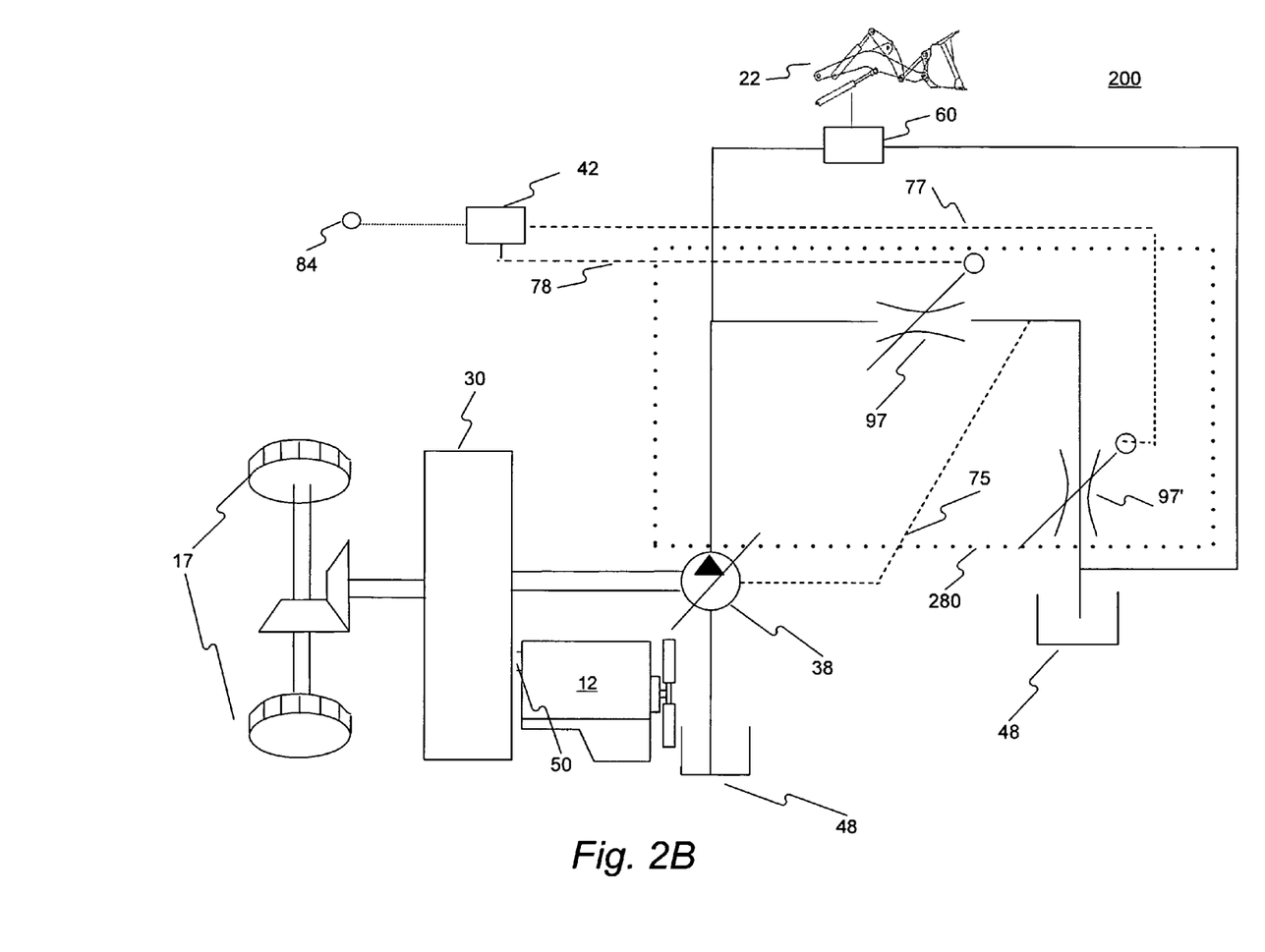

Variable area orifices may be configured to provide a variable pressure drop across an associated orifice by varying the area associated with the orifice. Because fluid flow may vary proportionally with the pressure drop and because the pressure drop of the variable area orifice may vary based on area, the variable area orifice may provide additional fluid control flexibility.

Pressure relief valves associated with hydraulic dissipation circuit 280 may be configured to control pressures (e.g., maximum pump pressure, circuit operating pressure, etc.) associated with hydraulic circuit 200 by allowing flow of the pressurized fluid back to reservoir 48 when such fluid has reached a predetermined pressure. Such control may utilize pilot pressures, springs, and other devices to determine when fluid should be permitted to flow back to reservoir 48 (e.g., when a maximum pressure in hydraulic dissipation circuit 280 is reached).

Other valves associated with hydraulic dissipation circuit 280 may perform various tasks such as flow control/direction, load sense provision, and load sense short circuit, among other things. Such valves may include load sense bypass valves, flow control valves, spool valves, and gate valves, among other things.

Heat exchangers (not shown) may be configured to dissipate heat associated with hydraulic dissipation circuit 280 and/or power source 12. Heat exchangers (not shown) may include shell and tube heat exchangers, plate heat exchangers, coil heat exchangers, regenerative heat exchangers, and/or any other suitable heat exchanger. Further, one or more heat exchangers may be used and may be integrated or separate from a cooling package (not shown) associated with machine 10. For example, a heat exchanger may be fluidly connected to hydraulic dissipation circuit 280 and may remove heat (e.g., in cooling package (not shown)) from the flow of fluid prior to the fluid returning to reservoir 48.

FIG. 2A illustrates one exemplary embodiment of a hydraulic dissipation circuit 280. According to this embodiment, hydraulic dissipation circuit 280 may include a variable area orifice 97, load sense signal line 75, and a load sense bypass spool valve 98, among other things. Both variable area orifice 97 and load sense bypass spool valve 98 may be communicatively connected to, and configured to receive control signals from controller 42. Further, both variable area orifice 97 and load sense bypass spool valve 98 may be fluidly connected to hydraulic pump 38.

In such an embodiment, variable area orifice 97 may be configured to provide variable flow control based proportionally on a variable pressure drop across variable area orifice 97. Load sense bypass spool valve 98 may be configured to feed a pump discharge pressure signal back to the load sense element of hydraulic pump 38 via load sense signal line 75. For example, retarding actuator 84 may provide an input signal indicative of a desired braking force to controller 42. Controller 42 may receive such a signal and generate a first control signal for transmission to load sense bypass spool valve 98 via line 77. The first control signal may be configured to cause load sense bypass spool valve 98 to transmit full pump discharge pressure to hydraulic pump 38 as a load sense signal. This load sense signal may then induce hydraulic pump 38 to increase flow in relation to the received load sense signal (e.g., maximum flow). Controller 42 may also transmit a control signal, via line 78, to variable area orifice 97 configured to cause variable area orifice 97 to vary pressure across the orifice in proportion to the desired braking force supplied by retarding actuator 84. The effect of forcing a pressurized flow of fluid across variable area orifice 97 may cause a load approximately equal to the flow rate across the orifice multiplied by the pressure associated with the orifice to be applied to hydraulic pump 38. This load may cause a corresponding dissipation of power (e.g., conversion to heat), which may be absorbed from power source 12, power conversion unit 30, or any other device operatively connected to hydraulic pump 38. The flow of fluid may then be directed to a heat exchanger (e.g., associated with cooling package (not shown)) after exiting variable area orifice 97 for dissipation of heat absorbed by the fluid during the process. Alternatively, the flow of fluid may be returned to reservoir 48, bypassing any heat exchanger.

FIG. 2B illustrates another exemplary embodiment of a hydraulic dissipation circuit 280. According to this embodiment, hydraulic dissipation circuit 280 may include a first variable area orifice 97, load sense signal line 75, and a second variable area orifice 97', among other things. Both variable area orifices 97 and 97' may be communicatively connected to, and configured to receive control signals from controller 42. Further, both variable area orifices 97 and 97' may be fluidly connected to hydraulic pump 38 in a series type arrangement.

In such an embodiment, first variable area orifice 97 may be configured to provide flow control based proportionally on a variable pressure drop across variable orifice 97. Load sense signal line 75 may be configured to provide the resulting pressure following first variable orifice 97 to hydraulic pump 38 as a load sense signal. Second variable area orifice 97' may be configured to variably control a pressure associated with hydraulic dissipation circuit 280. For example, retarding actuator 84 may provide an input signal indicative of a desired braking force to controller 42. Controller 42 may receive such a signal and provide a first control signal for transmission to second variable area orifice 97' via line 77. The first control signal may be configured to cause second variable area orifice 97' to vary a pressure drop across second variable area orifice 97' in proportion to the desired braking force, thereby setting a pressure associated with hydraulic circuit 200. Controller 42 may also transmit a control signal, via line 78, to first variable area orifice 97 configured to cause first variable area orifice 97 to modify a flow associated with the orifice in proportion to the desired braking force supplied by retarding actuator 84. A pressure signal associated with the resulting flow from first variable area orifice 97 may then be transmitted to hydraulic pump 38 as a load sense signal. This load sense signal may then induce hydraulic pump 38 to increase or decrease flow in relation to the received load sense signal. The effect of forcing a pressurized flow of fluid across second variable area orifice 97 at a flow rate determined in part by first variable area orifice 97 may cause a load approximately equal to the flow rate across second variable area orifice 97' multiplied by the pressure associated with second variable area orifice 97' to be applied to hydraulic pump 38. This load may cause a corresponding dissipation of power (e.g., conversion to heat). The dissipated power may be provided by power source 12, power conversion unit 30, or any other device operatively connected to hydraulic pump 38. The flow of fluid may then be directed to a heat exchanger (e.g., associated with cooling package (not shown)) after exiting variable area orifice 97 for dissipation of heat absorbed by the fluid during the process. Alternatively, the flow of fluid may be returned to reservoir 48, bypassing any heat exchanger.

Figure 2C:
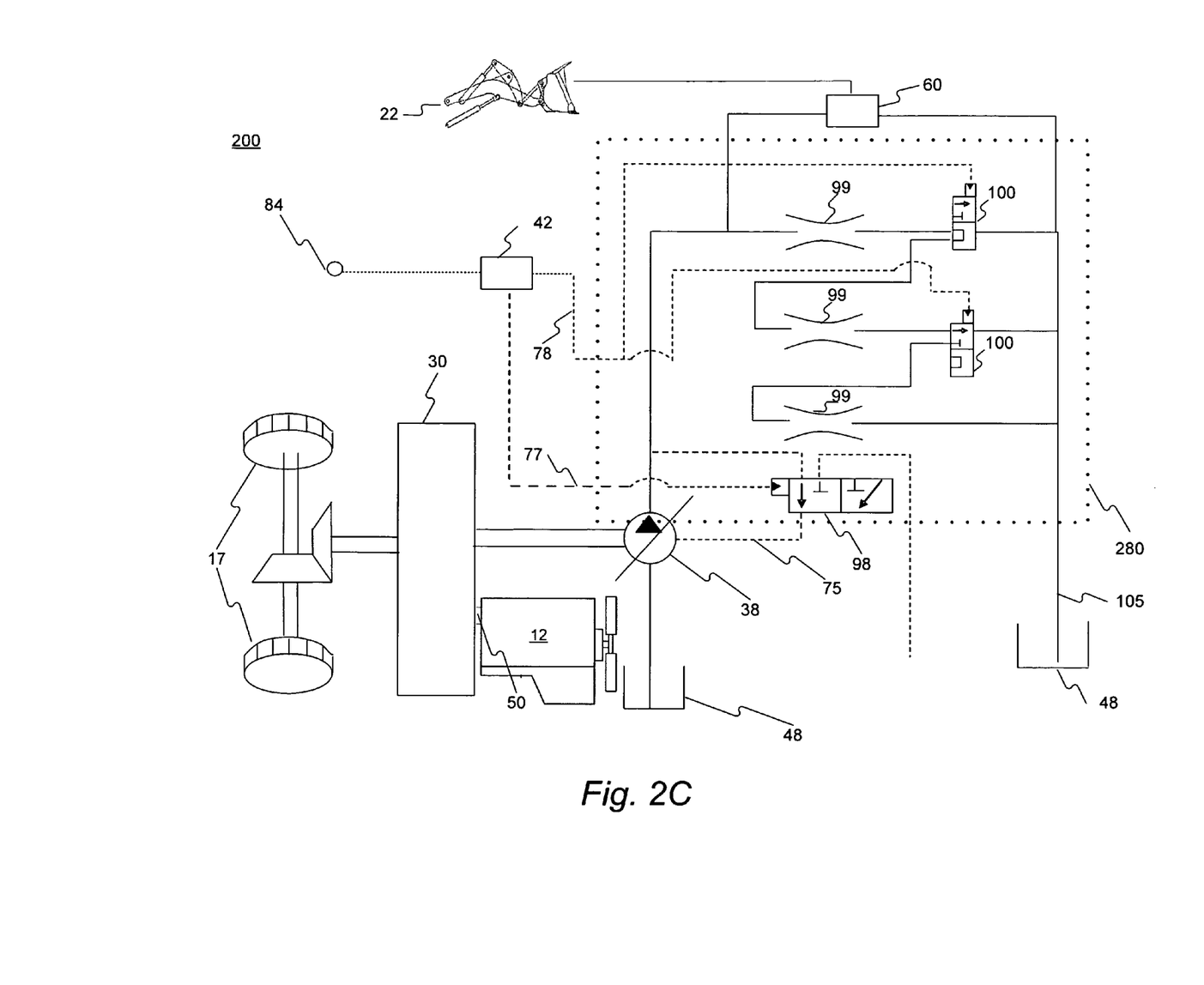
Figure 2D:
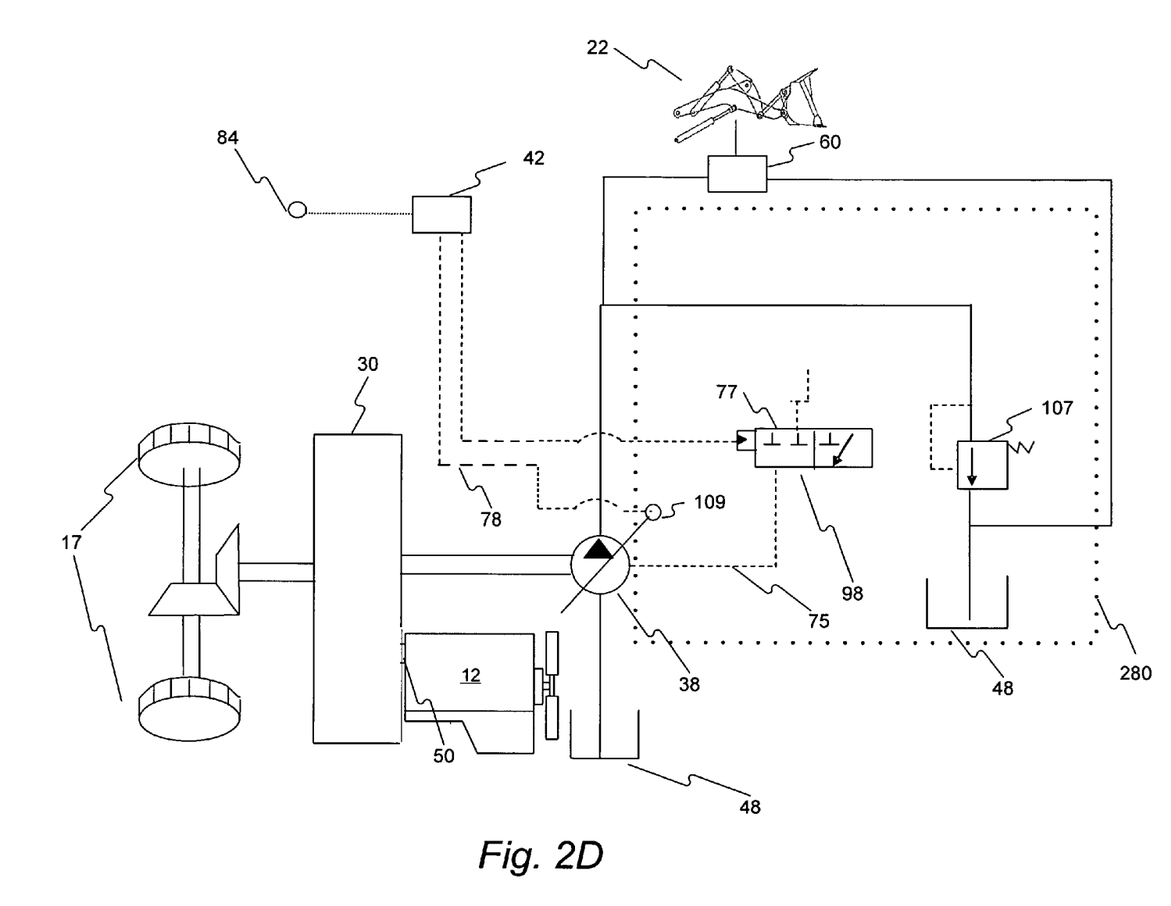

FIG. 2C illustrates yet another exemplary embodiment of a hydraulic dissipation circuit 280. According to this embodiment, hydraulic dissipation circuit 280 may include one or more fixed area orifices 99, one or more directional spool valves 100, and load sense signal line 75, among other things. Each of the one or more fixed area orifices 99 may be connected in parallel with one of the one or more directional spool valves 100. Further, the one or more fixed area orifices 99 and one or more directional spool valves 100 may be communicatively connected to, and configured to receive control signals from controller 42 as well as fluidly connected to hydraulic pump 38. Fixed area orifices 99 may be of any diameter and may vary in diameter (e.g., decreasing diameter in series) from one fixed area orifice 99 to the next.

In such an embodiment, load sense bypass spool valve 98 may be configured to feed a pump discharge pressure signal back to the load sense element of hydraulic pump 38 via load sense signal line 75. Further, each of the one or more fixed area orifices 99 may be configured to provide a fixed pressure drop across the orifice with a resulting flow rate proportional to the pressure drop across the orifice, the fluid density, and the fluid viscosity. Each of the one or more directional spool valves 100 may be configured to direct at least a portion of a flow of pressurized fluid to reservoir 48 or to a subsequent fixed area orifice 99 based on a control signal from controller 42. For example, retarding actuator 84 may provide an input signal indicative of a desired braking force to controller 42. Controller 42 may receive such a signal and provide a first control signal to load sense bypass spool valve 98 via line 77. The first control signal may be configured to cause load sense bypass spool valve 98 to transmit full pump discharge pressure to hydraulic pump 38 as a load sense signal. This load sense signal may then induce hydraulic pump 38 to increase flow in relation to the received load sense signal (e.g., maximum flow). Controller 42 may also transmit a second control signal, via line 78, to the one or more directional spool valves 100, which may cause the one or more directional spool valves 100 to direct a flow of fluid to a subsequent fixed area orifice 99 or to reservoir 48 via hydraulic line 105. Controller 42 may vary the second control signal in proportion to the desired braking force supplied by retarding actuator 84, thereby causing more or fewer of the one or more directional spool valves 100 to direct the flow of fluid to reservoir 48 or subsequent fixed area orifices 99. Such action may create a semi-variable level of retarding control based on the number of fixed orifices utilized. The effect of forcing a pressurized flow of fluid over each of the one or more fixed area orifices 99 may cause a load approximately equal to the flow rate across the orifice multiplied by the pressure associated with the orifice summed across the number of fixed area orifices 99 utilized, to be applied to hydraulic pump 38. This load may cause a corresponding dissipation of power (e.g., conversion to heat), which may be absorbed from power source 12, power conversion unit 30, or any other device operatively connected to hydraulic pump 38. The flow of fluid may then be directed to a heat exchanger (e.g., associated with cooling package (not shown)) after exiting the one or more fixed area orifices 99 for dissipation of heat absorbed by the fluid during the process. Alternatively, the flow of fluid may be returned directly to reservoir 48 via hydraulic line 105, bypassing any heat exchangers.

FIG. 2D illustrates yet another exemplary embodiment of a hydraulic dissipation circuit 280. According to this embodiment, hydraulic dissipation circuit 280 may include a pressure relief valve 107, an electro-hydraulic (EH) pump control 109, load sense signal line 75, and a load sense bypass spool valve 98, among other things. Load sense bypass spool valve 98 and EH pump control 109 may be communicatively connected to, and configured to receive control signals from controller 42. Further, both variable area orifice 97 and load sense bypass spool valve 98 may be fluidly connected to hydraulic pump 38. EH pump control 109 may be configured to modify flow characteristics associated be hydraulic pump 38 by mechanically modifying the swash plate associated with hydraulic pump 38 in response to a command from controller 42. This may allow EH pump control 109 to vary flow from hydraulic pump 38 substantially independently of other devices associated with hydraulic circuit 200.

In such an embodiment, pressure relief valve 107 may be configured to control pressures (e.g., maximum pump pressure, circuit operating pressure, etc.) associated with hydraulic dissipation circuit 280 by allowing flow of the pressurized fluid back to reservoir 48 when such fluid has reached a predetermined pressure. For example, pressure relief valve 107 may be configured to open and allow a flow of fluid to return to reservoir 48 when a pressure associated with a flow of fluid reaches or exceeds 1500 KPa.

Load sense bypass spool valve 98 may be configured to feed a pump discharge pressure signal back to the load sense element of hydraulic pump 38 via load sense signal line 75. For example, retarding actuator 84 may provide an input signal indicative of a desired braking force to controller 42. Controller 42 may receive such a signal and provide a first control signal for transmission to load sense bypass spool valve 98 via line 77. The first control signal may be configured to cause load sense bypass spool valve 98 to transmit full pump discharge pressure to hydraulic pump 38 as a load sense signal via line 75. This load sense signal may then induce hydraulic pump 38 to increase flow in relation to the received load sense signal (e.g., maximum flow). However, controller 42 may also transmit a control signal, via line 78, to EH pump control 109 configured to cause hydraulic pump 38 to vary flow based on a characteristic of the second control signal (e.g., a voltage indicating a desired braking force supplied by retarding actuator 84) at a pressure determined by pressure relief valve 107. Therefore, the effect of forcing a pressurized flow of fluid across pressure relief valve 107 may cause a load approximately equal to the flow rate across the pressure relief valve 107 multiplied by the pressure associated with pressure relief valve 107 to be applied to hydraulic pump 38. This load may cause a corresponding dissipation of power (e.g., conversion to heat), which may be absorbed from power source 12, power conversion unit 30, or any other device operatively connected to hydraulic pump 38. The flow of fluid may then be directed to a heat exchanger (e.g., associated with cooling package (not shown)) after exiting variable area orifice 97 for dissipation of heat absorbed by the fluid during the process. Alternatively, the flow of fluid may be returned to reservoir 48, bypassing any heat exchanger.

INDUSTRIAL APPLICABILITY

The disclosed systems and methods may be applicable to any powered system that includes an implement system and an associated hydraulic pump. The disclosed systems and methods may allow for retarding of power source 12 based on a braking force desired by an operator. In particular, the disclosed systems and methods may assist in reducing mechanical brake wear and power source over-speeding conditions without the addition of a dedicated engine retarder. Operation of the disclosed systems and methods will now be explained.

In certain embodiments, the flow and pressure of a fluid associated with hydraulic dissipation circuit 280 may be modified based in part on an input signal from retarding actuator 84. In such an embodiment, an input signal from retarding actuator 84 may be transmitted to controller 42 or other suitable device (e.g., a hydraulic cylinder) for processing. Controller 42 may receive the input signal and generate an appropriate control signal for transmission to one or more devices (e.g., a valve) associated with hydraulic dissipation circuit 280. The one or more devices may then respond in accordance with the received control signal by modifying the flow and pressure of fluid associated with hydraulic dissipation circuit 280. Such modifications within hydraulic dissipation circuit 280 may then generate a load on hydraulic pump 38, thereby absorbing energy from power source 12, power conversion unit 30, and/or other systems associated with hydraulic pump 38.

Figure 3:
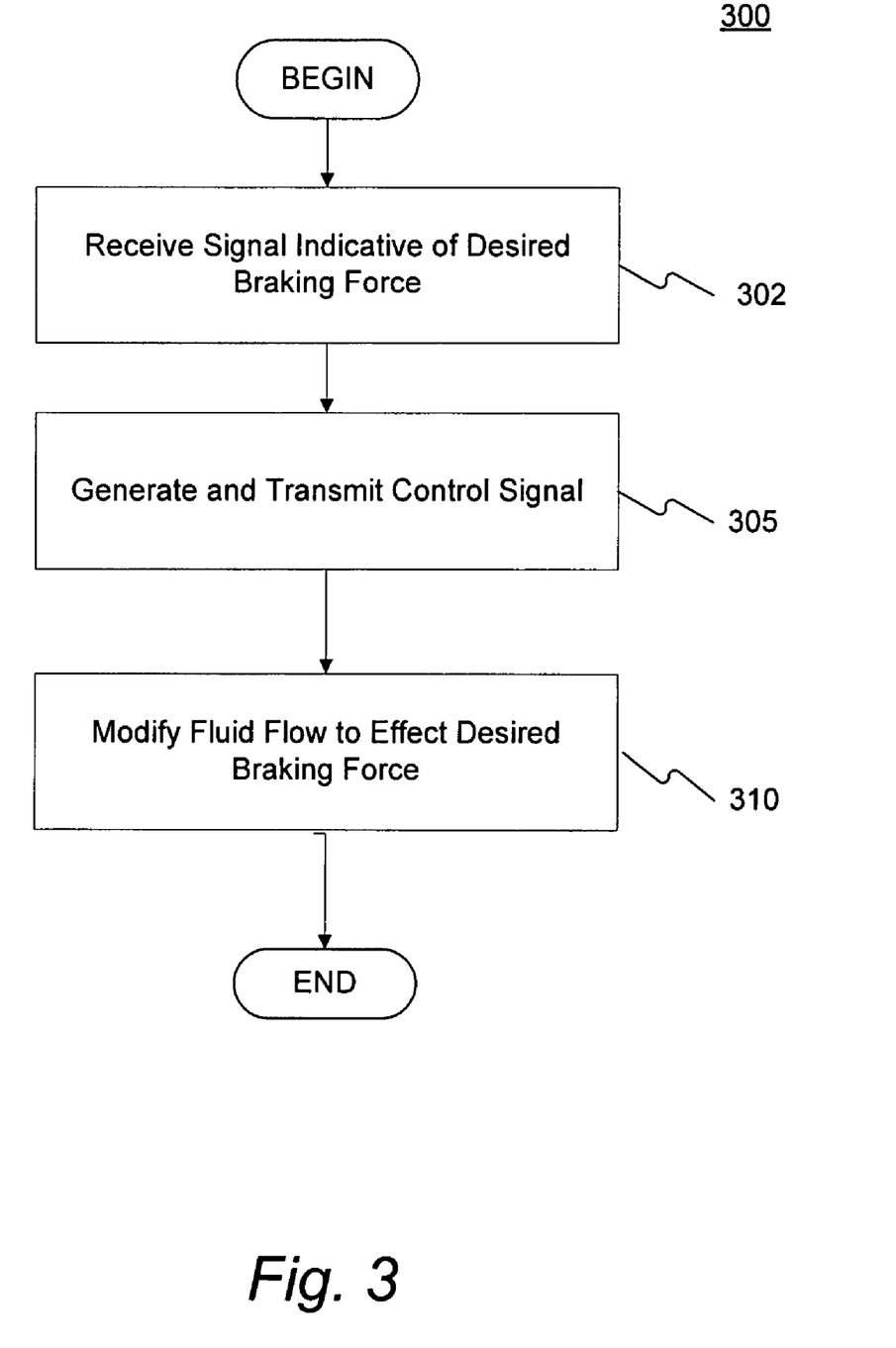
FIG. 3 is an exemplary flowchart illustrating one method for operating systems of the present disclosure.

FIG. 3 is an exemplary flowchart illustrating one method for controllably absorbing energy associated with a machine. Controller 42 may receive a signal from retarding actuator 84, or other suitable device, indicating a desired braking force (step 302). Such a signal may be any level between maximum braking and no braking. For example, an operator may step on a retarding pedal with an amount of force indicating a desired braking force. Controller 42 may then provide one or more control signals indicative of the desired braking force to components of hydraulic dissipation circuit 280 (step 305). For example, controller may transmit a first control signal including a characteristic of 1800 mA to load sense bypass spool valve 98 indicating that the full pump discharge pressure should be fed back to hydraulic pump 38. Controller 42 may also transmit a second control signal including a characteristic of 900 mA to EH pump control 109, indicating that hydraulic pump 38 should operate at 50% of maximum flow capacity. Once the one or more control signals have been transmitted by controller 42, devices associated with hydraulic dissipation circuit 280 may modify pressures and flows of fluid associated with hydraulic dissipation circuit 280 to cause a dissipation of energy associated with machine 10 (step 310). For example, by modifying flows and pressures of fluid associated with hydraulic circuit 280, a load may be applied to hydraulic pump 38. Application of such a load may result in energy associated with machine 10 (e.g., power source 12, power conversion unit 30, etc.) being converted to heat and absorbed by the flow of fluid within hydraulic dissipation circuit 280.

Because the systems and method of the present disclosure may operate based on an operator's desired braking force, reliance on mechanical braking systems may be reduced, which may result in longer maintenance intervals for such systems. Further, because the systems and method of the present disclosure may operate only when commanded by the operator, performance of the machine is impacted only when commanded by the operator.

It will be apparent to those skilled in the art that various modifications and variations can be made in the disclosed methods and systems without departing from the scope of the disclosure. Additionally, other embodiments of the method and system will be apparent to those skilled in the art from consideration of the specification. It is intended that the specification and examples be considered as exemplary only, with a true scope of the disclosure being indicated by the following claims and their equivalents.

We claim:

1. A system for controllably absorbing energy associated with a machine, comprising:
   a power source configured to propel the machine;
   a machine tool;
   a hydraulic cylinder configured to move the machine tool;
   a hydraulic pump driven by the power source to provide a flow of fluid to the hydraulic cylinder, the hydraulic pump having an output that varies based on a load signal associated with the hydraulic cylinder;
   a hydraulic dissipation circuit configured to receive fluid flow from the hydraulic pump and to apply a load on the hydraulic pump; and
   a controller configured to receive an input from an operator indicative of a desire to slow the machine, and to selectively cause the load signal to be overridden and an output of the hydraulic pump to be increased based on the input, the increased output being directed to the hydraulic dissipation circuit.

2. The system of claim 1, further including a variable restriction valve in the hydraulic dissipation circuit, the controller being further configured to selectively cause a restriction of the variable restriction valve to be adjusted based on the input to load the hydraulic pump by a desired amount.

3. The system of claim 1, further including a retarding pedal configured to generate the input when manipulated by the operator.

4. The system of claim 1, further including:
   a plurality of fixed area orifices in the hydraulic dissipation circuit; and
   at least one control valve in the hydraulic dissipation circuit, the controller being further configured to selectively cause the at least one control valve to switch the plurality of fixed area orifices between a parallel and a series flow configuration based on the input to adjust a total restriction of the hydraulic dissipation circuit and load the hydraulic pump by a desired amount.

5. The system of claim 1, wherein the the hydraulic pump has electro-hydraulic pump control.

6. The system of claim 1, further including a transmission operatively connecting the power source to a machine traction device and to the hydraulic pump.

7. The system of claim 6, wherein the transmission includes a continuously variable transmission.

8. The system of claim 6, wherein the power source is connected to drive the hydraulic pump via the transmission.

9. The system of claim 1, further including a heat exchanger fluidly connected to the hydraulic dissipation circuit and configured to receive the flow of fluid.

10. The system of claim 1, wherein the hydraulic cylinder is connected to receive fluid flow from the hydraulic pump in parallel with the hydraulic dissipation circuit.

11. A method for controllably absorbing energy associated with a machine, the method comprising:
   generating a flow of pressurized fluid;
   directing the flow of pressurized fluid to a machine tool;
   adjusting a rate of flow generation based on a signal associated with a load of the machine tool;
   receiving an operator input indicative of desired braking; and
   in response to the operator input, selectively overriding the signal, increasing the rate of flow generation, and restricting the flow of pressurized fluid to slow the machine.

12. The method of claim 11, wherein restricting the flow of pressurized fluid includes restricting the flow of pressurized fluid at a plurality of locations arranged in a series flow configuration.

13. The method of claim 12, further including rearranging a flow configuration through the plurality of locations between series and parallel to adjust the restricting.

14. The method of claim 11, further including combusting fuel to generate a mechanical power output, and directing the mechanical power output to generate the flow of pressurized fluid and to propel the machine.

15. A machine, comprising:
   a frame;
   a transmission mounted to the frame;
   a traction device driven by the transmission;
   a power source connected to the frame and configured to power the transmission;
   a tool;
   a variable displacement hydraulic pump driven by the power source to provide a flow of fluid to the tool in an amount related to a load signal associated with the tool;
   a hydraulic dissipation circuit configured to receive fluid flow from the hydraulic pump and to apply a load on the hydraulic pump; and
   a controller configured to receive an input from an operator indicative of a desire to slow the machine, and to selectively cause the load signal to be overridden and an output of the hydraulic pump to be increased based on the input, the increased output being directed to the hydraulic dissipation circuit.

16. The machine of claim 15, wherein the hydraulic dissipation circuit includes a variable restriction valve in the hydraulic dissipation circuit, the controller being further configured to selectively cause a restriction of the variable restriction valve to be adjusted based on the input to load the hydraulic pump by a desired amount.

17. The machine of claim 15, further including:
   a plurality of fixed area orifices in the hydraulic dissipation circuit; and
   at least one control valve in the hydraulic dissipation circuit, the controller being further configured to selectively cause the at least one control valve to switch the plurality of fixed area orifices between parallel and series flow configuration based on the input to adjust a total restriction of the hydraulic dissipation circuit and load the hydraulic pump by a desired amount.

18. The machine of claim 15, further including a retarding pedal configured to generate the input when manipulated by the operator.

19. The machine of claim 15, wherein the power source is connected to drive the hydraulic pump via the transmission.

20. The machine of claim 15, wherein the tool is connected to receive fluid flow from the hydraulic pump in parallel with the hydraulic dissipation circuit.

* * * * *